United States Patent

Konishi et al.

[11] 4,344,407
[45] Aug. 17, 1982

[54] CYLINDER HEAD, PORTS, AND PISTON CONFIGURATION

[75] Inventors: Masami Konishi, Toyota; Akio Kuramoto, Okazaki; Yorishige Maeda, Toyota; Norikatsu Ishikawa, Mishima; Makoto Suzuki, Susono, all of Japan

[73] Assignee: Toyota Jidosha Kogyo Kabushiki Kaisha, Toyota, Japan

[21] Appl. No.: 101,236

[22] Filed: Dec. 7, 1979

[30] Foreign Application Priority Data

Mar. 5, 1979 [JP] Japan ................................. 54-25364

[51] Int. Cl.³ .............................................. F02B 23/08
[52] U.S. Cl. .................................... 123/661; 123/279
[58] Field of Search ............... 123/657, 661, 662, 667, 123/279

[56] References Cited

U.S. PATENT DOCUMENTS

| | | | |
|---|---|---|---|
| 2,514,730 | 7/1950 | Sonderegger | 123/279 |
| 2,749,899 | 6/1956 | Mitchell | 123/279 |
| 2,969,786 | 1/1961 | Dolza | 123/661 |
| 2,991,780 | 7/1961 | Brien | 123/661 |

FOREIGN PATENT DOCUMENTS 1204434 9/1970 United Kingdom ................ 123/661
1217755 12/1970 United Kingdom ................ 123/661

OTHER PUBLICATIONS

Geschelin; Survey of Combustion Chamber Progress; Automotive Industries, Nov. 1, 1962; pp. 43-45, 72 and 73.

Primary Examiner—Craig R. Feinberg
Attorney, Agent, or Firm—Kenyon & Kenyon

[57] ABSTRACT

A combustion chamber is formed between a cylinder head, which has a central recess and planar surfaces on each side of it, and a juxtaposed piston, which has a central recess and planar surfaces on each side of it. Inlet and outlet ports are formed in the head with the axes of the ports on one side of a phantom plane that includes the axis of the cylinder. The juxtaposed planar regions of the cylinder head and piston define a first squish area between those planar portions on the same side of the phantom plane as the axes of the ports, and a second squish area, which is smaller than the first, between those planar surfaces of the head and piston on the other side of the phantom plane. A spark plug is mounted in the head so that its igniting tip is on the other side of the phantom plane from the axes of the ports but is close to the axis of the cylinder bore and to the planar region in which the squish areas are formed.

3 Claims, 3 Drawing Figures

CYLINDER HEAD, PORTS, AND PISTON CONFIGURATION

BACKGROUND OF THE INVENTION

The present invention relates to a cylinder head and piston configuration of an internal combustion engine, and more particularly relates to such a configuration which incorporates a squish area.

In spark ignition type internal combustion engines, it is well known that the shape of the combustion chamber and relative positions of the spark plug and intake and exhaust ports have considerable effect on the combustion of the mixture gas, and modifying the shape of the combustion chamber and the relative positions of the spark plug and the intake and exhaust ports is effective for improving engine performance parameters, such as output power, fuel consumption, silence of operation, quality of exhaust gases, and so forth. Important goals in modifying these factors are shortening the flame propagation distance, increasing combustion velocity by imparting desirable turbulence to the mixture gas during the latter half of the compression stroke, reducing the temperature rise of the end gas, so as to suppress knocking, and so forth.

In order to increase combustion velocity, squish is utilized in many internal combustion engines. This introduces swirling motion to the mixture gases, mainly in the radial direction of the cylinder bore, and is obtained by forming a squish region between a planar region on an upper part of the piston and a planar region on a lower part of the cylinder head. The planar regions approach one another closely when the piston is at its top dead center. Thus, the mixture gas between these surfaces is squashed outward and squirts into the combustion chamber, when the piston is at top dead center.

Further, in order to increase overall combustion velocity, it is desirable that combustion of the mixture in the combustion chamber is initiated from a point which is as close to the three-diminisionally central part of the combustion chamber as possible, provided that no substantial radially unbalanced flow of gas such as due to squish exists in the combustion chamber.

SUMMARY OF THE INVENTION

Therefore, it is an object of the present invention to provide an improved configuration for the cylinder head and the piston of an internal combustion engine, which satisfies the above mentioned two requirements with regard to generation of turbulences in the combustion chamber and the position of the igniting tip of the spark plug.

According to the present invention, the cylinder block of an internal combustion engine has a cylinder bore closed at one end by a cylinder head that has two planar regions on the surface facing the bore. A piston with coplanar regions on an end surface opposing the cylinder head moves reciprocatingly within the bore to such an extent that, at one end of its travel, its coplanar regions come in close proximity to the planar regions on the surface of the cylinder head. The piston has a piston depression at least partly delimited by the coplanar regions on the end surface of the piston, and the cylinder head has a cylinder head depression at least partly delimited by the coplanar regions on the surface of the cylinder head facing the bore and is located partially opposing the piston depression. The cylinder head has inlet and exhaust ports opening in the wall of the cylinder head depression with their centers offset from the axis of the cylinder bore on one side of a phantom plane that includes the axis of the cylinder bore. A spark plug is mounted in the cylinder head so as to project into the cylinder head depression with its igniting tip offset from the axis of the cylinder bore on the other side of the phantom plane. The coplanar regions of the surface of the cylinder head and the coplanar regions of the end surface of the piston define squish areas between them when the piston is at the cylinder head end, or the top dead center, of its range of travel. The squish areas are generally on opposite sides of the phantom plane.

According to this construction, because the inlet and exhaust ports are offset from the axis of the cylinder bore on one side of the phantom plane that includes the axis of the cylinder bore, the igniting tip of the spark plug on the other side of the phantom plane can be positioned relatively close to the axis of the cylinder bore. Because both the cylinder head and the piston are formed with depressions, the igniting tip of the spark plug can be positioned close to an axially middle portion of the combustion chamber formed by the cylinder head and the piston depression. There will be no interference between the piston and the igniting tip, even though the spark plug is positioned relatively close to the three-dimensionally central point of the combustion chamber, thereby reducing the maximum distance of flame propagation. This makes combustion of mixture in the combustion chamber more uniform, thereby improving thermal efficiency and silence of operation of the engine, as well as suppressing knocking.

Further, the mixture gas squashed from the squish area when the piston reaches its top dead center flows so as to traverse the combustion chamber along its largest diameter and so as to generate turbulences of mixture along the largest central cross-section of the combustion chamber. Therefore when combustion of the mixture is initiated from a position which is close to but shifted from the three-dimensionally central portion of the combustion chamber, so as to compensate for the radial squish flow, the velocities of flame propagation in the direction along the axis of the cylinder bore and in the direction along the diameter of the cylinder bore are modified so as to make propagation of the combustion flame to the entire region of the combustion chamber more uniform.

In this case, therefore, positioning the igniting tip of the spark plug relatively close to the three-dimensionally central portion of the combustion chamber as modified to compensate for squishing, and then squishing the mixture gas along the boundary between the cylinder head depression and the piston depression synegistically cooperate with one another so as to improve combustion of fuel-air mixture in the combustion chamber.

BRIEF DESCRIPTION OF THE DRAWINGS

The present invention will become more fully and clearly understood from the following description of a preferred embodiment thereof, which should be taken in conjunction with the accompanied drawings. It should be lucidly apprehended, however, that this description of embodiment, and the drawings, are all given for the purposes of explanation only, and are not to be taken in any way as limiting the scope of the present invention, which is to be defined solely by the regiment and proper scope of the appended claims. In the drawings:

DESCRIPTION OF THE PREFERRED EMBODIMENT

Figure 1:
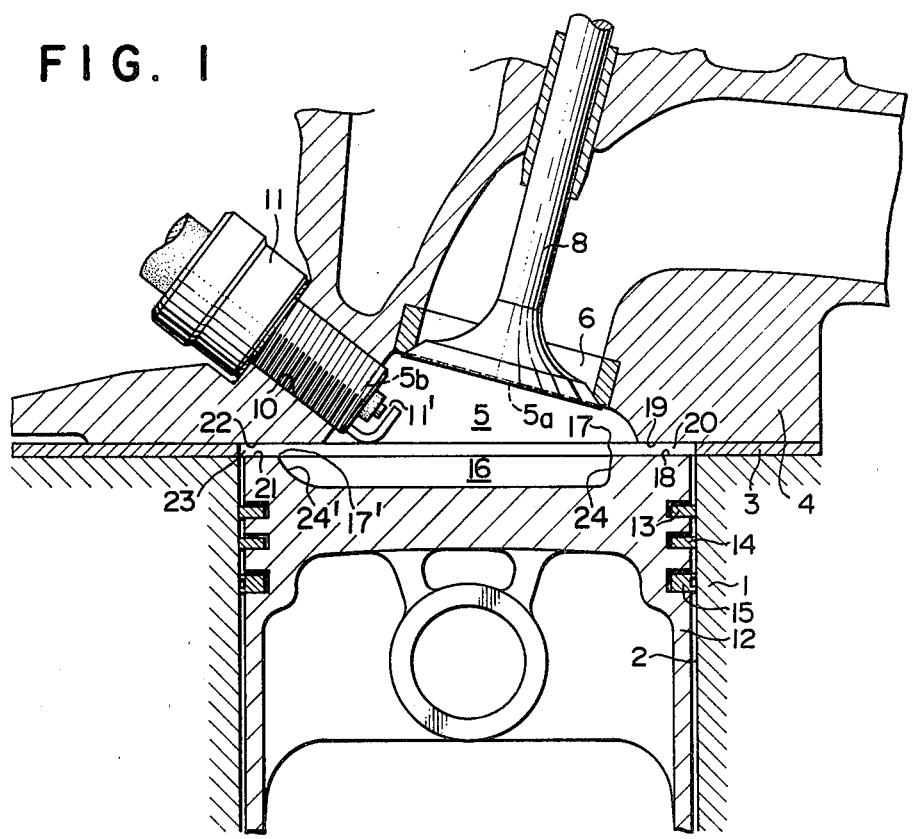
FIG. 1 is a longitudinal sectional view, taken along the line I—I in FIG. 2, of the cylinder head and piston of an internal combustion engine, according to a preferred embodiment of the present invention.
Figure 2:
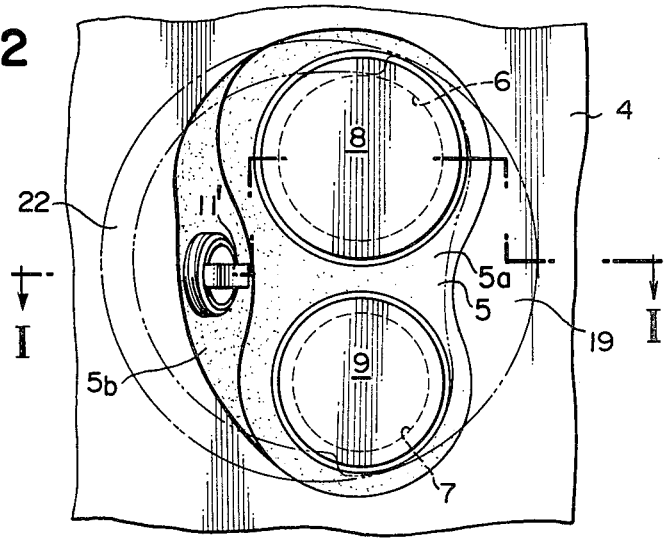
FIG. 2 is a bottom plan view of the cylinder head of the engine of FIG. 1.
Figure 3:
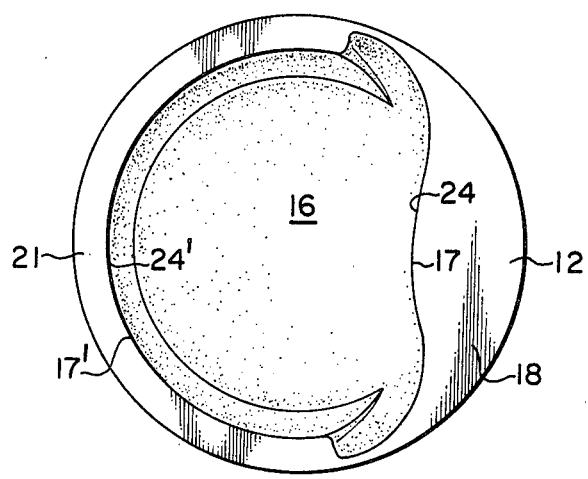
FIG. 3 is a plan view of the piston of the engine of FIG. 1.

In FIGS. 1-3, showing the preferred embodiment of the present invention, a cylinder block 1 has a cylinder bore 2. On the upper plane surface of the cylinder block 1 is fitted a gasket 3, on which a cylinder head 4 is fixed to close the upper end of the bore 2.

In the cylinder bore 2 is a piston 12, which is fitted with piston rings 13, 14, and 15.

The cylinder head 4 is formed with a cylinder head cavity 5, which, in this embodiment, is wedge-shaped and is offset to one side of the axis of the cylinder bore 2. In the section shown in FIG. 1, the cavity 2 is offset to the right-hand side. The lower face of the cylinder head surrounding this cavity and opposed to the cylinder bore 2 is substantially in the upper plane of the gasket 3, i.e., is parallel to and slightly displaced from the plane of the top of the cylinder block 1.

On one side (the right-hand side in FIG. 1), the roof of the cavity 5 has a fairly gentle slope 5a, while on the other side of the cavity 5, the roof has a fairly steep slope 5b. In the gently sloped roof 5a are an inlet port 6 and an exhaust port 7, the centers of which are offset from the axis of the cylinder 2 and, as viewed in FIG. 1 and 2, are located to the right of a plane perpendicular to the drawing and including the axis of the cylinder 2.

In the steeply sloped roof 5b of the cavity 5 in a spark plug hole 10 on the other side of the above mentioned phantom plane, so located that the axis of the hole 10 intersects the axis of the cylinder bore 2. Into the hole 10 is screwed an ignition plug 11 that has a gap, or igniting tip, 11'—that is, the point at which spark occurs, approximately—that projects into the combustion chamber for enough so that the ignition tip 11' is positioned relatively close to the axis of the cylinder bore 2. Further, the ignition tip 11' of the spark plug is positioned so as to be relatively close to the border between the cylinder head cavity 5 and a piston cavity 16 when the piston is at its top dead center as shown in FIG. 1. The piston cavity 16 is formed in the upper face of the piston 12, the rest of the upper surface being in one plane. This cavity has a contour best shown in FIG. 3 and includes a portion 17 (the right-hand portion as viewed in FIGS. 1-3) which is substantially in coincidance with the peripheries of the inlet and exhaust ports 6 and 7. The remaining part of 17' is substantially an arc co-axial with the periphery of the piston 12.

The top surface of the piston 12 has a part 18 on one side (i.e. on the right-hand side as viewed in FIGS. 1 and 3) of the above-mentioned phantom plane, which is the side remote from the spark plug 11. The part 18 is opposed to a part 19 of the bottom surface of the cylinder head 4, and between the parts 18 and 19 is a first squish area 20.

Further, the top surface of the piston 12 has another part, or region, 21 on the other side (i.e., the left-hand side as viewed in FIGS. 1 and 3) of the above-mentioned phantom plane, i.e. on the same side of the axis of the cylinder bore as the spark plug 11. The part 21 is juxtaposed with respect to a part 22 of the lower surface of the cylinder head 4 to form a second squish area 23, which is smaller than the first squish area 20. The side wall portion 24 of the piston cavity 16 which borders the first squish area 20 is substantially perpendicular to the squish plane, whereas the side wall portion 24' of the piston cavity 16 which borders the second squish area 23 is gently inclined relative to the squish plane.

In operation of this engine, according to the normal Otto cycle, during the compression stroke, as the piston 22 rises toward its top dead center, the mixture gas in the combustion chamber is compressed. When the piston 12 rises so as to approach its top dead center, the mixture gas in the first and second squish areas is compressed much more strongly than the rest of the mixture gas in the cylinder, as these squish areas become very small in their vertical dimension, and thereby this mixture gas is squirted sideward into the combustion chamber, which, at the top dead center of the piston, as mentioned above, is substantially formed by the piston cavity 16 and the cylinder head cavity 5. That is, squish streams are generated. These squish streams flow in the combustion chamber so as to traverse it along the border between the piston cavity 16 and the cylinder head cavity 5, thereby causing turbulences in the combustion chamber particularly in the region of the border.

Because the first squish area 20 is larger in area than the second squish area 23, the squirting of mixture gas from the first squish area 20 is stronger than that from the second squish area 23, and these two squish streams come into collision with one another approximately at the region occupied by the igniting tip 11' of the ignition plug 11. Micro-turbulence, therefore, at the point of collision of the two squish streams occurs in large part in the plane which is parallel to the axis of the cylinder and is perpendicular to the plane of the drawing paper in FIG. 1, and contains the tip 11' of the ignition plug 11. This is very useful for promoting good combustion and ignition.

In this case, because the igniting tip 11' of the ignition plug 11 is positioned relatively close to the three-dimensionally central portion of the combustion chamber, differences between the distances of flame propagation from the tip 11' of the ignition plug to various portions of the combustion chamber are correspondingly smaller, whereby propagation of combustion from the tip 11' to the entire region of the combustion chamber is more desirably uniformalized.

With respect to the first squish area 20, the side wall 24 of the piston cavity 16 which defines a sharp edge of the squish area 20 contributes to producing sharp squish streams, whereas the side wall 24' which defines a blunt edge of the second squish area 23 has an effect of generating turbulences in an early stage of the flow of the squish stream.

As is apparent from the figures, because the inlet and exhaust ports 6 and 7 are offset to one side of the axis of the cylinder bore 2 so that the centers of these ports are located on one side of the above mentioned phantom plane which includes the axis of the cylinder bore and extends perpendicularly to the plane of the drawing paper bearing FIG. 1, it is possible to position the igniting tip 11' of the spark plug 11 closer to the axis of the cylinder bore so that the igniting tip 11' from which combustion of the mixture is initiated closer to the three-dimensionally central point of the combustion chamber, so that a relatively moderate ratio of difference between the first and second squish areas completely compensates for the offset of the tip 11 from the geometrical center of the combustion chamber.

When the piston moves past its top dead center and descends, after the mixture gas has been ignited by the ignition plug, the mixture gas is sucked into the squish areas 20 and 23, in the reverse manner to the effect which happens when the piston rises. This also aids smooth combustion.

Therefore, it is possible to operate an engine provided with the present invention at an air/fuel ratio substantially leaner than has heretofore been utilized in practice, without causing undue emmission of noxious exhaust gas components. Further, exhaust gas recirculation can be performed in these conditions without impeding stable combustion. Due to the rapid combustion available by the present invention, the tendency toward abnormal combustion such as knocking of the engine can be decreased. Thereby, a very substantial improvement in power output and fuel consumption can be available.

Although, therefore, the present invention has been shown and described with respect to a preferred embodiment thereof, it should not be considered as limited to this, however, for mere and simple generalizations, or other detailed embodiments. Yet further variations could be made, by one skilled in the art, to the details of this particular embodiment. Therefore, it is desired that the scope of the present invention, and of the monopoly which is thought to be granted by U.S. patent, should be defined, not by any perhaps purely fortuitous details of the shown embodiment, or by the drawings, but solely by the legitimate and proper scope of the appended claims.

We claim:

1. In an internal combustion engine having a cylinder block with a cylinder bore therein, a piston reciprocatingly movable within the cylinder bore, a cylinder head comprising a surface facing and closing one end of the bore, and inlet and exhaust ports and a spark plug in the cylinder head, the combination comprising:

first and second planar regions on the surface of the cylinder head facing the cylinder bore, the first and second regions being on opposite sides of a phantom plane that includes the axis of the cylinder bore;

first and second planar regions on the end surface of the piston facing the first and second portions of the surface of the cylinder head to form therewith first and second squish areas, respectively;

a piston depression in the end surface of the piston between the first and second regions of the end surface, the piston depression comprising a contour that includes a portion on one side thereof substantially coincident with the peripheries of the inlet and exhaust ports, the remainder of the surface of the piston depression on an opposite side thereof comprising an arcuate surface substantially coaxial with the periphery of the piston; and a cylinder head recess between the first and second regions of the surface of the cylinder head, the cylinder head recess being substantially opposite the piston depression to form therewith a combustion chamber that extends on opposite sides of the planar regions of the cylinder head and the planar regions of the piston, the inlet and exhaust ports having axes located toward the same side of the phantom plane as the first squish area, the spark plug extending through the cylinder head on the opposite side of the phantom plane from the inlet and exhaust port axes and having an igniting tip close to the axis of the cylinder bore and close to the planes of the planar regions defining the squish areas, the first squish area on the same side of the phantom plane as the axes of the ports being larger than the second squish area on the same side of the phantom plane as the spark plug.

2. The invention as defined in claim 7 in which the cylinder head recess is wedge-shaped and comprises a roof having a gently sloped part and a steeply sloped part, the inlet and exhaust ports being located to open into the gently sloped part, and the steeply sloped part having a spark plug hole in which the spark plug is mounted.

3. The invention as defined in claim 1 wherein the part of the end surface of the piston adjacent the first planar region thereof that forms one surface of the first squish area is angled substantially perpendicularly to the planar regions on the end surface of the piston.

* * * * *

UNITED STATES PATENT AND TRADEMARK OFFICE
CERTIFICATE OF CORRECTION

PATENT NO. : 4,344,407
DATED : August 17, 1982
INVENTOR(S) : Masami Konishi, et al It is certified that error appears in the above—identified patent and that said Letters Patent is hereby corrected as shown below:

Col. 2, line 22, after "head" insert --depression--.

Col. 3, line 43, change "for" to --far--.

Col. 6, line 34, change "7" to --1--.

Signed and Sealed this

Nineteenth Day of October 1982

[SEAL]

Attest:

Attesting Officer

GERALD J. MOSSINGHOFF

Commissioner of Patents and Trademarks